(12) United States Patent
Salfelner

(10) Patent No.: US 9,425,841 B1
(45) Date of Patent: Aug. 23, 2016

(54) CONFIGURABLE HARMONIC FILTERING

(71) Applicant: NXP B.V., Eindhoven (NL)

(72) Inventor: Anton Salfelner, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/645,237

(22) Filed: Mar. 11, 2015

(51) Int. Cl.
*H04B 1/18* (2006.01)
*H04B 1/12* (2006.01)
*H04B 1/10* (2006.01)

(52) U.S. Cl.
CPC .............. *H04B 1/12* (2013.01); *H04B 1/1027* (2013.01); *H04B 2001/1072* (2013.01)

(58) Field of Classification Search
CPC ........................................................ H04B 1/12
USPC ....................................................... 455/188.1
See application file for complete search history.

(56) References Cited

U.S. PATENT DOCUMENTS

2010/0189205 A1\* 7/2010 Yoshida .................... H04B 1/10
375/350
2014/0194076 A1\* 7/2014 Hwang .................. H04B 15/00
455/77

\* cited by examiner

*Primary Examiner* — Sanh Phu
(74) *Attorney, Agent, or Firm* — Rajeev Madnawat

(57) ABSTRACT

A system for rejecting a selected harmonic from an input signal is disclosed. The system includes a mixer for creating a signal of new frequency from two input signals of different frequencies. The mixer is coupled to the input signal a frequency generator coupled to the mixer. The frequency generator is configured to generate a signal having a selected duty cycle. The system also includes a controller coupled to a frequency generator.

10 Claims, 3 Drawing Sheets

CONFIGURABLE HARMONIC FILTERING

BACKGROUND

In typical wireless system that includes a transmitter and a receiver, the receiver is not only sensitive to the wanted radio frequency (RF) input ($RF_{wanted}$), but also to the harmonics (e.g., $2*RF_{wanted}$, $3*RF_{wanted}$, $4*RF_{wanted}$, $5*RF_{wanted}$, ...). Frequency components at these harmonics may block or interfere with the wanted frequency channel.

Band filters are employed to filter out unwanted frequencies outside of the $RF_{wanted}$ frequency band. However, these filters typically attenuate the unwanted frequencies to a level instead of completely or substantially removing the frequency components, especially harmonics, from the RF input.

A harmonic filter is used to eliminate the harmonic distortion caused by appliances. Harmonics are currents and voltages that are continuous multiples of the fundamental frequency of 60 Hz such as 120 Hz (2nd harmonic) and 300 Hz (5th harmonic). Harmonic currents provide power that cannot be used and also takes up electrical system capacity. Large quantities of harmonics can lead to malfunctioning of the system that results in downtime and increase in operating costs. The second harmonic would have a frequency of 120 Hz; the third harmonic would have a frequency of 180 Hz and so on.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for rejecting a selected harmonic from an input signal is disclosed. The system includes a mixer for creating a signal of new frequency from two input signals of different frequencies. The mixer is coupled to the input signal a frequency generator coupled to the mixer. The frequency generator is configured to generate a signal having a selected duty cycle. The system also includes a controller coupled to a frequency generator.

In some embodiments, the controller is configured to control the duty cycle of the signal generated by the frequency generator. The controller controls the duty cycle based on the selected harmonic to be rejected. The controller may be configured to determine the duty cycle based on the Fourier coefficients calculations.

The system may also include a received signal strength indicator (RSSI) coupled to the controller and the mixer through a switch. The switch is configured to connect and disconnect the RSSI from the mixer. The controller may be configured to determine the duty cycle based on an output value of the RSSI. The output value of the RSSI is continuously monitored where the switch is in a position to connect the RSSI to the mixer, wherein during the monitoring of the output value of the RSSI, a duty cycle of the signal generated by the frequency generator is continuously varied until the output value of the RSSI reaches a selected value. The selected value may be zero or substantial zero. Alternatively, the selected value may be set through customer setting.

In another embodiment, a system for rejecting a selected harmonic from an input signal is disclosed. The system includes a mixer for creating a signal of new frequency from two input signals of different frequencies. The mixer is coupled to the input signal and a frequency generator coupled to the mixer. The frequency generator is configured to generate a signal having 20% duty cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
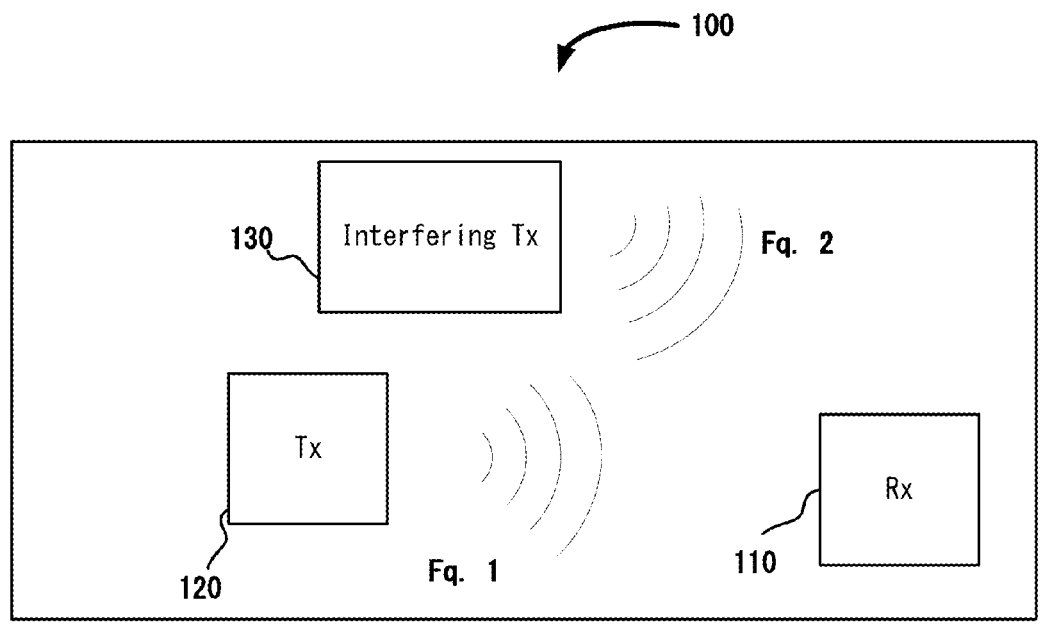
FIG. 1 is a depiction of a wireless system including a receiver, a plurality of transmitter.

FIG. 1 illustrates a wireless system 100 including a receiver 110, a transmitter 120 and an interfering transmitter 130. The transmitter 120 is configured to transmit at a preselected frequency Fq.1 and the interfering transmitter 130 is configured to transmit at a preselected frequency Fq.2. Typically, frequency bands are regulated by governmental authority such that different types of applications are allocated different frequency bands so as to avoid any frequency conflicts among transmitters and receivers of different applications. However, it is still possible that Fq.2 is a harmonic of Fq.1. For example, frequency 434 MHz may be used by one application while frequency 2.17 GHz may be used by another application. As it happens, frequency 2.17 GHz=5*434 MHz. That is, frequency 2.17 GHz is the $5^{th}$ harmonic of the frequency 434 MHz. Therefore, properly filtered out, the frequency 2.17 GHz may interfere with the receivers using the frequency 434 MHz.

Harmonic Rejection mixers do exist to filter out unwanted harmonics. A frequency mixer is a nonlinear electrical circuit that creates new frequencies from two signals applied to it. Typically, these mixers use multiphase clock references and requires considerable complexity, consume more power and chip area. In smaller devices such as electronic car keys, the overall size of the chip, cost and power consumption are an important factors. The embodiments described herein provides a system that is simple to implement and consumes less power and chip area.

Figure 2:
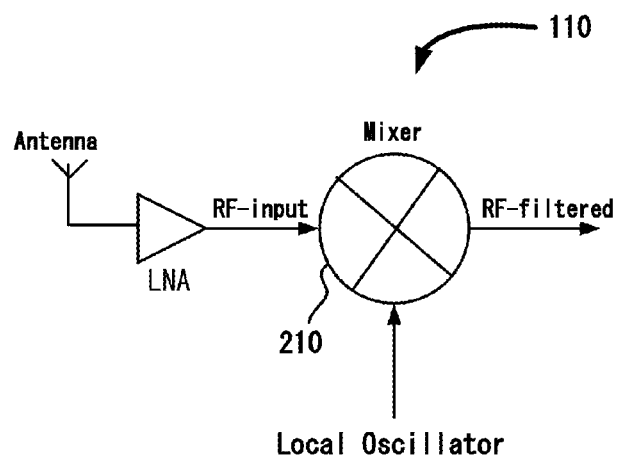
FIG. 2 illustrates schematic of a portion of a receiver in accordance to one of more embodiments of the present disclosure.

FIG. 2 illustrates a section of the receiver 110. As shown, the receiver 110 includes an antenna for receiving RF input, a low noise amplifier (LNA). The LNA is an electronic amplifier used to amplify possibly very weak signals captured by the antenna. The LNA is typically located very close to the detection device to reduce losses in the feed line. The receiver 110 also includes a mixer 210 to filter the RF input based on the output of a local oscillator (LO) to produce filtered RF output. The LO signal is typically a switching signal that causes the mixer to produce intermediate outputs that are combined to produce a filtered output. The unwanted frequencies are typically attenuated (or filtered out) in this process.

The mixer 210 is an important stage of the RF signal chain. The mixer 210 allows the receiver 110 to be tuned across a wide band of interest, then translates the desired, arbitrary received signal frequency to a known, fixed frequency. This allows the signal of interest to be efficiently processed, filtered, and demodulated.

Figure 3:
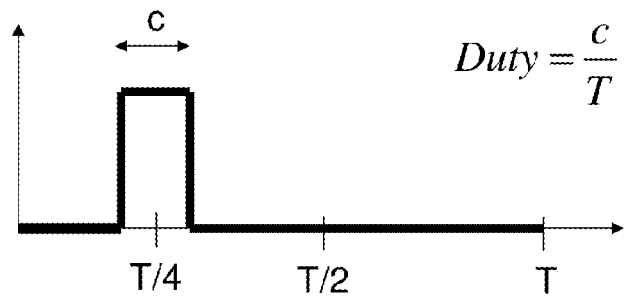
FIG. 3 illustrates a schematic of a control wave of a selected duty cycle in accordance to one of more embodiments of the present disclosure.
Figure 4:
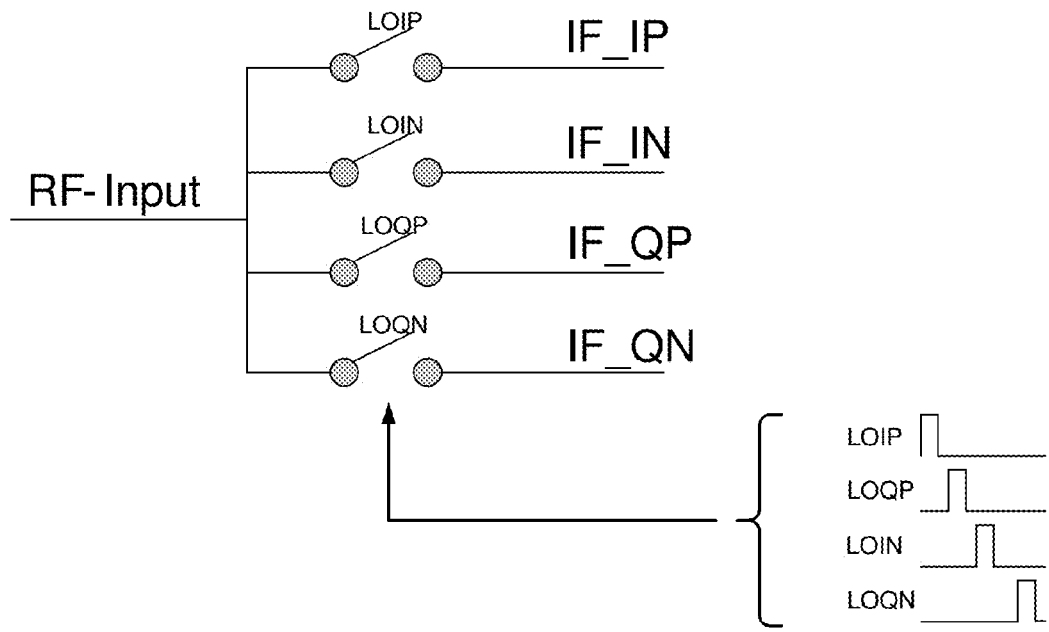
FIG. 4 illustrates intermediate outputs of a mixer of the receiver in accordance with an embodiment of the present disclosure.

FIG. 3 illustrates a sample LO waveform of the duty cycle c/T, where c is the width of the pulse and T is the width of one whole cycle of the LO waveform. The frequency of the LO waveform, typically, is in the range of the RF input frequency. In one example, to eliminate the $5^{th}$ harmonic, a 20% duty cycle LO waveform may be used. As illustrated in FIG. 4, the LO waveform is used to drive the gates of switches LOIP, LOIN, LOQP and LOQN and intermediate frequencies IF_IP, IF_IN, IF_QP and IF_QN are produced. These intermediate frequencies are combined to produce the filtered RF output from the mixer 210.

It should be noted that to avoid obfuscating the disclosure, components, systems and methods that within the common knowledge of a person skilled in the art are not being shown and discussed herein.

Fourier constants of the LO waveform may be computed as follows:

$$s_n(t) = \frac{a_0}{2} + a_1\cos(\omega t) + a_2\cos(2\omega t) + \ldots + b_1\sin(\omega t) + b_2\sin(2\omega t) + \ldots$$

$$a_0 = \frac{2}{T}\int_0^T f(t)\,dt = 2\text{Duty}$$

$$a_k = \frac{2}{T}\int_0^T f(t)\cos(k\omega t)\,dt$$
$$= \frac{2}{T}\frac{1}{k\omega}[\sin(k\omega t)]_{\frac{T}{4}(1-2\text{Duty})}^{\frac{T}{4}(1+2\text{Duty})}$$
$$= \frac{2}{k\pi}\cos\left(k\frac{\pi}{2}\right)\sin(k\pi\text{Duty})$$

The output is 0 (zero) for odd k (harmonic.

$$b_k = \frac{2}{T}\int_0^T f(t)\sin(k\omega t)\,dt$$
$$= -\frac{2}{T}\frac{1}{k\omega}[\cos(k\omega t)]_{\frac{T}{4}(1-2\text{Duty})}^{\frac{T}{4}(1+2\text{Duty})}$$
$$= \frac{2}{k\pi}\sin\left(k\frac{\pi}{2}\right)\sin(k\pi\text{Duty})$$

$$= \begin{cases} \frac{2}{\pi}\sin(\pi\text{Duty}); k=1 & \to \begin{cases} \frac{2}{\pi}; \text{Duty}=50\% \\ \frac{\sqrt{2}}{\pi}; \text{Duty}=25\% \end{cases} \\ -\frac{2}{3\pi}\sin(3\pi\text{Duty}); k=3 & \\ \frac{2}{5\pi}\sin(5\pi\text{Duty}); k=5 & \to \begin{cases} -\frac{\sqrt{2}}{2}; \text{Duty}=25\% \\ 0; \text{Duty}=20\% \end{cases} \end{cases}$$

As evident, for k=5 (the $5^{th}$ harmonic), at 20% duty cycle the output is zero. In other words, 20% duty cycle is most appropriate to filter the $5^{th}$ harmonic.

Figure 5:
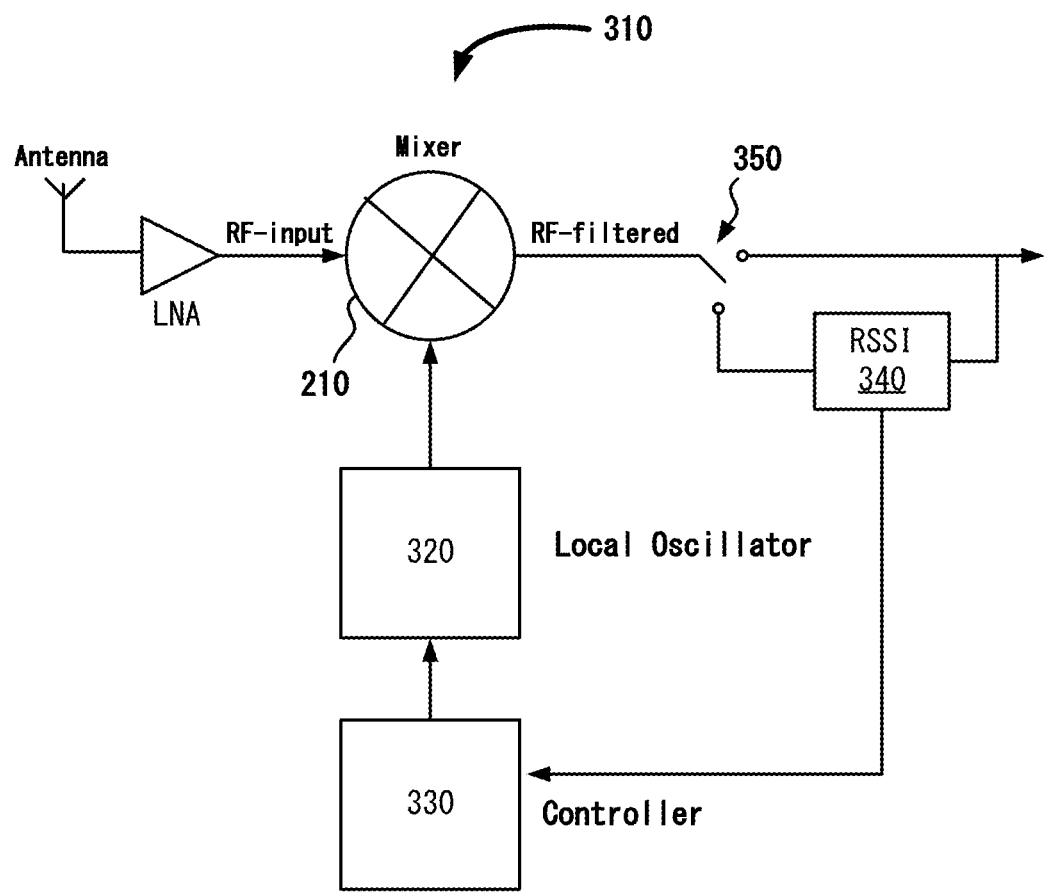
FIG. 5 illustrates a configurable mixer in accordance with an embodiment of the present disclosure.

FIG. 5 illustrates a system 310 that includes a receiver 110, a local oscillator 320 that is controllable by a controller 330. The controller 330 is programmable and based on a setting, may perform Fourier coefficient calculations to determine a correct duty cycle of the LO waveform to filter out a desired harmonic. In one embodiment, multiple sets of mixers and oscillators may be used to cancel out multiple harmonics based on the control signal from the controller 330. The setting would include harmonic sequence or sequences that need to be canceled. The system 310 may also include a Received Signal Strength Indicator (RSSI) 340 coupled to the RF-filtered output of the mixer 210. The RSSI 340 may be coupled to the mixer 210 through a switch 350. The RSSI 340 may be coupled to the controller 330. The controller 330 may be configured to control the duty cycle of the LO waveform generated by the local oscillator 320 based on the output of the RSSI 340. In one example, a signal that needs to be rejected by the system 310 may be inputted as RF-input while the switch 350 is in the position to connect the RSSI 340 to the mixer 210. The controller 330 sets a duty cycle for the LO waveform and determines the value of the RSSI. The controller 330 then varies the LO waveform until a minimum RSSI value is received. The minimum RSSI value may be close to zero in some embodiments.

In one example, the controller 330 receives the harmonic number (k in above equations) and solve the above noted Fourier equations at different duty cycles to find the right duty cycle at which $a_k$ and $b_k$ are zero and instructs the local oscillator to generate the LO waveform at the determined duty cycle.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for rejecting a selected harmonic from an input signal, the system comprising:
    a mixer for creating a signal of new frequency from two input signals of different frequencies, the mixer is coupled to the input signal;
    a frequency generator coupled to the mixer, wherein the frequency generator is configured to generate a signal having a selected duty cycle;
    a controller coupled to the frequency generator; and
    a received signal strength indicator (RSSI) coupled to the controller and the mixer through a switch, wherein the switch is configured to connect and disconnect the RSSI from the mixer.

2. The system of claim 1, wherein the controller is configured to control the duty cycle of the signal generated by the frequency generator.

3. The system of claim 2, wherein the controller is adapted to control the duty cycle based on the selected harmonic to be rejected.

4. The system of claim 3, wherein the controller is configured to determine the duty cycle based on the Fourier coefficients calculations.

5. The system of claim 1, wherein the controller is configured to determine the duty cycle based on an output value of the RSSI.

6. The system of claim 5, wherein the output value of the RSSI is continuously monitored where the switch is in a position to connect the RSSI to the mixer, wherein during the monitoring of the output value of the RSSI, a duty cycle of the signal generated by the frequency generator is continuously varied until the output value of the RSSI reaches a selected value.

7. The system of claim 6, wherein the selected value is zero.

8. The system of claim 6, wherein the selected value is substantially close to zero.

9. A system for rejecting a selected harmonic from an input signal, the system comprising:
    a mixer for creating a signal of new frequency from two input signals of different frequencies, the mixer is coupled to the input signal;
    a frequency generator coupled to the mixer, wherein the frequency generator is configured to generate a signal having a duty cycle;
    a controller coupled to the frequency generator; and
    a received signal strength indicator (RSSI) coupled to the controller and an output of the mixer through a switch, wherein the switch is configured to connect and disconnect the RSSI from the mixer, wherein the controller is configured to vary the duty cycle of the generated signal based an input from the RSSI.

10. The system of claim 9, wherein the controller is configured to perform in a feedback loop to vary the duty cycle until a lowest value of the input from the RSSI is obtained.

* * * * *